Figures 1, 2:
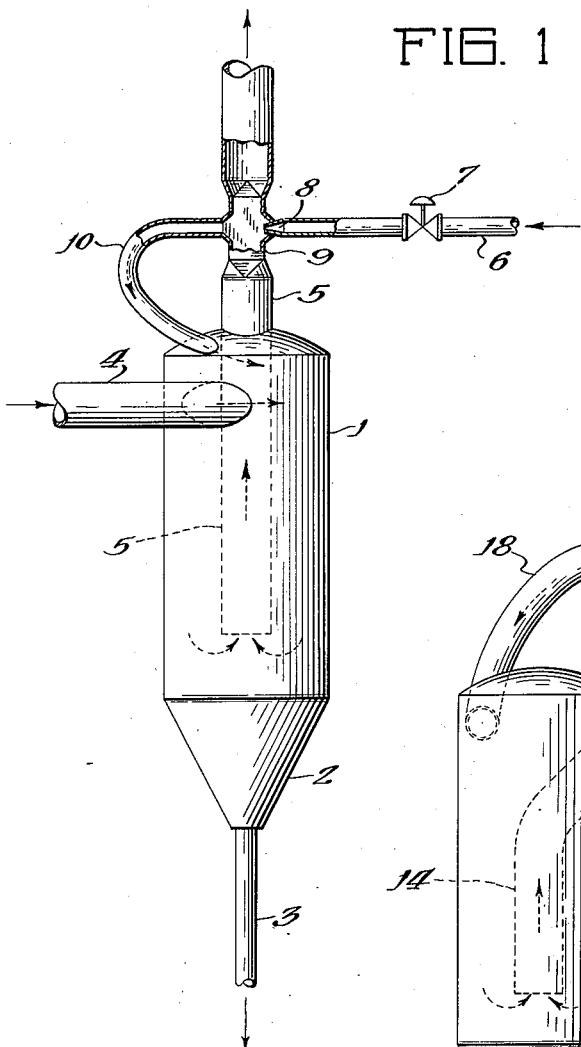

INVENTOR.
Jon Beam

Patented Apr. 22, 1952

2,593,718

UNITED STATES PATENT OFFICE 2,593,718

APPARATUS FOR RECOVERY OF FINELY DIVIDED PARTICLES

Jon Beam, Blue Ridge, Ga., assignor to Universal Oil Products Company, Chicago, Ill., a corporation of Delaware Application October 1, 1949, Serial No. 119,027

6 Claims. (Cl. 183—83)

This invention relates to improved means for separating and recovering particles in connection with a cyclone or centrifugal type of particle separator, and more particularly to means for removing finely divided particles which may remain entrained with the cleaned gas outlet stream, and thus provide improved efficiency in the removal of particles from a particle laden gaseous or vaporous stream.

The improved separating means of this invention may be used for all types of particle separating operations and under the same conditions, or in the same manner, as the more conventional types of cyclone or centrifugal separators, such as in the removal of dust, soot, ashes, and the like, or for removing solid contacting materials such as catalysts, or heat carrying particles. The gaseous or vaporous stream may be of any type, including air, combustion gases, chemical or petroleum vapors, or the like, and in addition the carrying stream may be supplied either in a heated or cold state to the separating apparatus. The increasing use of finely divided solid catalytic materials in the chemical and petroleum conversion processes has emphasized the importance of obtaining a high separating and recovery efficiency in order to prevent the loss of these expensive catalytic materials. For example, in the fluidized catalytic cracking of petroleums, the powdered or manufactured finely divided catalysts, which are used in large quantities, are continuously contacted in a reaction zone by petroleum vapors, and in a regenerating zone by an oxygen containing stream. However, the catalysts used are relatively expensive and in order to maintain low operating costs in these conversion operations, it is desirable to obtain a high order of efficiency in the separation of the gases from the solid particles with the ultimate retention of substantially all the finely divided material within the processing chambers.

It is a principal object of the present invention to provide an improved cyclone type of separator which permits greater efficiency in the removal of finely divided particles from the fluid particle laden streams.

It is a further object of the invention to provide a modified form of cyclone or centrifugal type of separator which provides means for removing finely divided materials still entrained with the clean gas outlet stream, with such means provided for attaining the increased efficiency being relatively inexpensive.

Briefly, the separation method of the present invention relates to a cyclonic or centrifugal separation of particles from a particle laden stream, where the stream passes tangentially into a confined cylindrical separation zone and entrained particles are thrown to the wall of the zone, with the particles being removed from the lower end thereof while continuously discharging a resulting gaseous stream substantially free of particles, and the improvement comprising, passing a scrubbing stream at a relatively high velocity transversely across the full cross sectional area of the gaseous stream passing from the centrifugal separation zone, and subsequently passing the scrubbing stream with entrained particles to the upper portion of the confined zone.

The scrubbing stream passing across the cleaned gaseous stream may be a portion or all of the primary particle laden stream passing to the centrifugal separation zone for removal and recovery of entrained particles. However, preferably the scrubbing stream is an independent gaseous stream of steam, air, or other suitable medium which can be regulated in pressure, velocity, and quantity to provide an optimum scrubbing or stripping action on the discharged stream.

Broadly, an improved apparatus of this invention embodies the construction features of the ordinary type of cyclone or centrifugal type of separator having a vertically disposed cylindrical chamber, tangential inlet means to the upper portion thereof for introducing a particle laden stream, a lower conically shaped particle collecting section with a particle outlet conduit therefrom, and an open-ended outlet conduit extending upwardly from the interior of the lower portion of the chamber and providing thereby means for discharging the resulting gaseous or vaporous stream relatively free of particles, and the improved means for substantially removing all entrained particles remaining within the gaseous stream passing outwardly from the discharge conduit, comprising, a fluid inlet conduit and orifice means connecting to the cleaned stream outlet conduit, with the inlet orifice arranged to pass a high velocity stream transversely across the full cross sectional area of the outlet conduit, and a transfer conduit from the latter to the inlet means at the upper end of the cylindrical chamber, the transfer conduit extending from opposite the inlet orifice for the high velocity stream whereby to pass the latter with recovered entrained particles to the cylindrical chamber and the centrifugal separating zone of the apparatus.

I have found that a thin or narrow high velocity gaseous stream is effective to pick up and carry out suspended particles entrained with a slower or low velocity gaseous stream moving at right angles or transversely through the high velocity jet stream. Thus, the present invention provides means for introducing a high velocity and controlled shape stream, transversely across the clean gas outlet conduit of the particle separating apparatus and subsequently conveying the jet or high velocity stream, together with removed entrained particles to the interior of the cyclone separating chamber of the apparatus.

In a preferred embodiment, an extraneous scrubbing fluid or gas medium is utilized and is passed transversely across the full cross sectional area of the clean gas outlet conduit in a manner to pick up and remove any entrained particles that are moving upwardly through the cleaned gas outlet conduit, and subsequently pass the scrubbing medium to the tangential inlet means at the upper portion of the cylindrical chamber of the apparatus.

In many installations, centrifugal types of separators are used in two or more stages to effect a more complete removal of entrained material from a gaseous stream, particularly when it is necessary to remove substantially all of the entrained particles, or alternately, where the solid material is of considerable value and it is desirable to retain as much as possible within the processing unit. The use of multiple stages is of course expensive in that additional separating units and conduits are necessary to effect the recovery, and in addition a considerable pressure drop must be effected through multiple separators. Therefore, where a single separating apparatus, as provided by the present invention, may be utilized to effect a high efficiency in the removal of or recovery of finely divided particles, there is a decided economic advantage.

In some instances, it is possible to use all or a portion of the particle laden stream as the scrubbing stream or high velocity jet stream which passes transversely across the gas outlet conduit of the centrifugal chamber. In other words, by properly controlling the velocity and cross section of the particle laden stream so that it is jetted across the path of the slower moving gaseous stream passing upwardly through an outlet conduit, it is possible to pick up residual particles entrained with the outgoing gas stream and subsequently transfer the entire fluid stream and entrained particles to the upper portion of the cylindrical chamber of the apparatus, where by the use of a tangential inlet a normal type of centrifugal separation takes place within the vertically disposed chamber and the bulk of the solid material is recovered from the lower section of the unit, to in turn be passed back to processing apparatus or to be recovered and used in any desired manner.

The accompanying drawing and the following description thereof will serve to show more clearly the construction and operation of the improved operation and separator as provided by the present invention.

Figure 1 of the drawing is an elevational view of one embodiment of the apparatus, with means for separately introducing the particle laden stream and a scrubbing stream to the chamber portion of the separator.

Figure 2 of the drawing is an elevational view, partially in section, of another embodiment of the improved centrifugal separating apparatus, having means to pass all of the particle laden stream transversely across the gas outlet conduit of the unit, whereby the particle laden stream itself is utilized to serve as the high velocity stream scrubbing entrained particles from the out-going stream.

Referring now to Figure 1 of the drawing, there is indicated a vertically disposed cylindrical chamber 1 having a conically shaped lower section 2 with a particle outlet conduit 3, and a tangential inlet 4 at the upper end of the chamber 1. The inlet or conduit 4 connects tangentially to the wall of the chamber 1 so that a particle laden stream is introduced tangentially into the interior of the unit and passes spirally downwardly through the chamber, causing entrained particles to be thrown to the wall of the chamber and provides their substantial removal in the manner of usual type of cyclone or centrifugal type of separator. The gaseous or vaporous stream which is undergoing the particle separation step, passes upwardly, from the lower interior portion of the chamber 1, through an open-ended outlet conduit 5, which in this embodiment extends vertically upward from the top of the chamber 1 in a manner suitable to discharge the gaseous fluid stream from the unit to the atmosphere or to other processing equipment. The major portion of the entrained particles that enter the separator by way of the tangential inlet 4, are collected within the lower section or hopper 2 and are ultimately passed through the particle discharge conduit 3 to a desired zone for re-use, or alternately for disposal. In accordance with the present embodiment, a scrubbing medium, which may be steam, air, or other suitable gaseous or fluid medium, is introduced by way of conduit 6 and control valve 7 to a restricted inlet orifice 8, that in turn is constructed to discharge the scrubbing medium uniformly and at high velocity across the full sectional area of the gas stream passing outwardly from the apparatus by way of outlet conduit 5.

In the drawing, a transition piece 9, which is of rectangular cross section and of narrower width than the conduit 5, is provided so that an elongated slot-like orifice 8 may effectively pass transversely across the entire gaseous stream flowing upwardly through conduit 5 and the transition section 9. A conduit 10 extends from opposite the inlet orifice 8 to the upper end of the cylindrical chamber 1 and preferably like the tangential inlet 4, is arranged to pass the scrubbing medium and entrained particles tangentially into the interior chamber 1 and in a manner to pass concurrently with the particle laden stream that enters through the tangential inlet 4. In a usual type of cyclone or centrifugal separator, the gaseous stream passes upwardly and outwardly through a suitable outlet duct and there should be enough pressure drop available to permit a relatively slow moving stream. However, even with a relatively efficient centrifugal separation, there are always some entrained particles passing with the cleaned gas stream which are not removed in a single stage separator. Thus, by introducing a scrubbing gas or other gaseous medium, by way of line 6 and control valve 7 it is possible with the improved apparatus and arrangement to substantially remove all of these entrained particles. It is also desirable to have pressure available whereby to permit a substantially large pressure drop across the cleaning or scrubbing zone. Figure 1 of the drawing indicates a fixed type of orifice 8, however, the velocity and quantity of the stream may be varied by the control valve 7.

With small size separating units and relatively small quantities of gas or vapor with entrained particles being handled, it may be possible to provide a slot type of orifice for introducing the scrubbing medium, and satisfactorily traversing the area of the outlet conduit and effectively remove entrained particles and pass them by way of a conduit, similar to 10, whereby they are returned to the centrifugal portion of the unit. However, as indicated in the drawing, it may be found desirable in most installations to provide a narrowed transition section of rectangular shape, such as 9, in order that the scrubbing medium be passed uniformly across a relatively narrow width of the outlet stream and insure its complete transverse prior to passing into the passageway as provided by the conduit 10, carrying the particles and the scrubbing medium to the centrifugal separation zone.

Referring now to Figure 2 of the drawing, there is indicated a modified apparatus embodiment of the improved separator having means for removing or withdrawing entrained particles from the gas outlet stream. As in the previously described embodiment, a vertically disposed cylindrical chamber 11 has a conically shaped lower section 12 and a particle outlet conduit 13. However, the gas outlet conduit 14 is indicated as extending from the lower interior portion of the chamber 11 upwardly and outwardly through the upper side portion of the chamber to a scrubbing section as provided by the rectangular transition section 15. Also, in this modified embodiment of the unit, the entire particle laden stream being charged to the centrifugal apparatus passes by way of conduit 16 to the scrubbing section 15, and therein is restricted in flow by adjustable orifice plates 17, whereby to pass a ribbon like stream transversely across the entire width of section 15 and the entire cross sectional area of the upwardly flowing gas stream passing by way of conduit 14 from the interior of the centrifugal section of the unit. Directly opposite the slotted orifice as provided by plates 17 is a conduit 18 suitable to pass the particle laden stream to the upper portion of the vertical cylindrical chamber 11 and to introduce this stream tangentially into the interior of the chamber whereby a usual type of centrifugal particle separation may be effected as the stream passes spirally downwardly through the interior of the chamber to the lower portion thereof.

The drawing indicates diagrammatically seating and guiding means 19, yokes 20 and adjustable threaded stems 21, that in turn permit the orifice plates 17 to be slid in and out in a manner of slide valves or gate valves and thus provide the means for controlling the introduction and flow of the stream passing by way of conduits 16 and 18 to the centrifugal separating zone, as well as the transverse flow across the gas outlet conduit 14 and section 15.

Where the velocity of the main primary particle laden stream passing by way of conduit 16 is insufficient to provide the desired velocity of the stream leaving the orifice plates 17 for traversing the outlet gas stream within restricted section 15, then additional air, steam, or a suitable gas may be introduced by way of the axillary conduits 22 and control valve 23, so that a high velocity scrubbing stream can be jetted across the transition area 15 to the conduit 18 and effect the desired removal of all entrained particles that are passing upwardly with the outlet gas. As hereinbefore noted, it is desirable to maintain a relatively narrow width zone at the scrubbing section in order to permit the high velocity jet stream to effect the scrubbing of the particles from the slower moving outlet stream, and also insure the direct cross flow of the scrubbing stream with little or no deflection by the upwardly moving stream.

It is to be noted that the present drawing is diagrammatic and that the improved apparatus of this invention is not to be restricted to the exact embodiments which are illustrated, for obviously minor construction modifications may be made in accordance with customary types of centrifugal separators, as well as in the construction of the conduits, ducts, and the like. The outlet duct 14 in Figure 2 of the drawing may if preferred pass vertically upwardly through the top of the chamber 11 and the transfer conduit 18 formed to accommodate a vertically disposed gas outlet and still maintain a tangential introduction of the particle laden stream into the upper end of the chamber 11. In addition it may be pointed out that in connection with Figure 1 of the drawing, the transfer conduit 10 may pass from the transition section 9 to the tangential inlet member 4, such that the primary particle laden stream and the scrubbing fluid are introduced together and tangentially into the upper portion of the cylindrical chamber 1.

I claim as my invention:

1. In a centrifugal type of particle separator having a cylindrical chamber, a lower particle collecting section and a particle outlet therefrom, tangential inlet means to said chamber for a particle laden stream, and an open-ended outlet conduit extending upwardly from the interior of the lower portion of said cylindrical chamber suitable for discharging a relatively clean gaseous stream therefrom, the improvement which comprises, a scrubbing fluid conduit and inlet orifice means connected to said cleaned stream outlet conduit exteriorally of said chamber, with said orifice arranged to pass a fluid stream transversely across the full cross sectional area of said outlet conduit, and conduit means extending from said cleaned gas outlet conduit and opposite said orifice to the upper end of said cylindrical chamber.

2. In a centrifugal type of particle separating apparatus, having a vertically disposed cylindrical chamber, tangential inlet means to the upper portion of said chamber suitable to introduce a particle laden stream thereto, a particle collecting section, particle outlet means therefrom, and an open-ended gas outlet conduit extending upwardly from the interior of the lower portion of said chamber suitable to discharge a cleaned gaseous stream from said chamber, the improvement comprising, scrubbing fluid inlet means connecting with said outlet conduit exteriorally of said chamber and arranged to pass a scrubbing stream transversely across the full cross sectional area of said gas outlet conduit, and conduit means extending from said gas outlet conduit and opposite said scrubbing stream inlet means to the upper portion of said cylindrical chamber of said apparatus.

3. An improved centrifugal type of particle separating apparatus, comprising in combination, a vertically disposed cylindrical chamber having a lower particle collecting section and particle outlet means therefrom, a tangential inlet to the upper portion of said chamber providing for the introduction of the particle laden stream tangentially to said chamber and a centrifugal flow of the stream and its entrained particles within the interior thereof, an open-ended gas outlet conduit extending upwardly from the interior of the lower portion of said cylindrical chamber and providing a cleaned gaseous stream outlet from said chamber, an inlet conduit and orifice connecting with said gas outlet conduit exteriorally of said chamber, said orifice positioned and arranged to pass a ribbon-like charge stream transversely across said outlet conduit and the gaseous stream passing therethrough, and conduit means connecting with and extending from said gas outlet conduit opposite said inlet orifice to said tangential inlet at the upper portion of said cylindrical chamber, whereby the particle laden stream passes transversely across said cleaned gas outlet conduit as a scrubbing stream prior to being introduced to said cylindrical chamber for a centrifugal type of particle separation therein.

4. An improved centrifugal type of particle separating apparatus, which comprises in combination, a vertically cylindrical chamber having a lower particle collecting section and particle outlet means therefrom, a tangential inlet connecting to the upper portion of said chamber and disposed to charge a particle laden stream tangentially thereto and provide a centrifugal flow of the stream and its entrained particles within the interior of said cylindrical chamber, an open-ended outlet conduit extending axially upwardly from the interior of the lower portion of said cylindrical chamber and providing a cleaned stream outlet therefrom, a scrubbing fluid inlet, and orifice connecting with said outlet conduit exteriorally of said chamber, said inlet orifice arranged to pass a scrubbing fluid stream transversely across a portion of said outlet conduit, and conduit means connecting with and extending from said outlet conduit opposite said scrubbing fluid inlet orifice to the upper portion of said cylindrical chamber, whereby to have a scrubbing fluid stream remove entrained particles remaining in said cleaned stream outlet conduit and transport them to said chamber of said centrifugal separating apparatus.

5. The apparatus of claim 4 further characterized in that said scrubbing fluid inlet connecting with said clean stream outlet conduit has a restricted orifice extending laterally across the width of said outlet conduit, whereby said scrubbing fluid passes at high velocity transversely across the full cross sectional area of said outlet conduit and outlet stream, and said conduit means extending to said chamber from said outlet conduit connects tangentially with said chamber in a manner passing the scrubbing fluid stream concurrently with said tangential inlet introducing the particle laden stream to said cylindrical chamber of said apparatus.

6. The apparatus of claim 5 still further characterized in that said scrubbing fluid inlet connecting with said cleaned stream outlet conduit has an adjustable orifice having means varying the resulting form and velocity of the scrubbing fluid stream passing transversely across said outlet conduit.

JON BEAM.

REFERENCES CITED

The following references are of record in the file of this patent:

UNITED STATES PATENTS

| Number | Name | Date |
|---|---|---|
| 1,600,762 | Hawley | Sept. 21, 1926 |
| 2,259,919 | Bacon | Oct. 21, 1941 |